United States Patent
Rao

(10) Patent No.: US 7,225,186 B2
(45) Date of Patent: May 29, 2007

(54) BINARY SEARCH TREE SYSTEM AND METHOD

(75) Inventor: Sumita Rao, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 521 days.

(21) Appl. No.: 10/810,753

(22) Filed: Mar. 26, 2004

(65) Prior Publication Data

US 2005/0216445 A1   Sep. 29, 2005

(51) Int. Cl.
    G06F 17/30   (2006.01)
(52) U.S. Cl. .......................................... 707/3; 711/170
(58) Field of Classification Search .................. 707/3, 707/7, 206; 711/117, 170, 171–173
    See application file for complete search history.

(56) References Cited

U.S. PATENT DOCUMENTS

| 6,178,414 | B1 * | 1/2001 | Beckmann et al. ............. 707/3 |
| 6,917,954 | B2 * | 7/2005 | Ahmad et al. ............... 707/205 |
| 7,072,885 | B2 * | 7/2006 | Cao et al. ....................... 707/3 |
| 7,076,511 | B1 * | 7/2006 | Lari et al. .................... 707/206 |
| 2005/0071501 | A1 * | 3/2005 | Cao et al. .................... 709/238 |

FOREIGN PATENT DOCUMENTS

EP    0 817 044 A    1/1998
WO   WO 03/081461 A   10/2003

OTHER PUBLICATIONS

International Search Report: PCT/US2005/008300 (Aug. 16, 2005).
"Indexing Records by Content" IBM Technical Disclosure Bulletin, IBM Corp. New York, US, vol. 31, No. 5, Oct. 1, 1998.
Aho Alfred, Hopcroft John, Ullman Jeffrey: "Data Structures and Algorithms" 1987, Addison Wesley Publishing Company, Reading, MA., US, XP002338082.
Anon.: "A structure for matching records using a sorted binary tree" Research Disclosure, Kenneth Mason Pub. Westborne, GB, vol. 347, No. 9, Mar. 1993 XP007118784.

* cited by examiner

*Primary Examiner*—Don Wong
*Assistant Examiner*—Hung Tran Vy

(57) ABSTRACT

A binary search tree is provided for efficiently organizing values for a set of items, even when values are duplicated. In generating the binary search tree, the value of each item in a set of values is determined. If a particular value is unique and is found only once in the set, than that unique value is used as a node in the binary search tree. If a value is duplicative and is found two or more times in the set, then the duplicative value is used as a hook in the binary search tree. The hook element has a list branch that is used to identify items having a value equal to the duplicative value. A node tree may be extended from a second branch of the hook, with the node tree having a base node equal to the duplicative value. The base node may have a first branch for holding a value less than the duplicative value, and a second branch for holding a value greater than the duplicative value.

5 Claims, 7 Drawing Sheets

BINARY SEARCH TREE SYSTEM AND METHOD

BACKGROUND

The field of the present invention is automated sorting and selection processes. More particularly, the present invention relates to a process for generating and using a binary search tree.

A binary search is a technique for locating an item in an organized arrangement. Typically, items in the arrangement are organized according to the values of the items, for example, in a sequential list. In a binary search, the search constraint, or key, is compared to the value of one of the items in the arrangement. If a larger value is desired, then the search may continue in the portion of the arrangement having larger values, and if a smaller value is desired, then the search may continue in the portion of the arrangement having smaller values. In this way, each comparison reduces the number of potential matches, until the desired value is found.

A binary search tree is a particularly useful arrangement for organizing items. In generating the tree, the value of each item becomes a "node" on the binary search tree. A "node" is a decision point on a tree, and is set at the value of one of the items. Nodes may have up to two branches, with one branch receiving values that are less than the node value, and the other branch receiving values that are larger than the node value. The first value added to a branch becomes a node on that branch. As additional values are added, the branch grows by adding additional nodes and branches, and thereby becomes a subtree. By convention, a node with one or two branches may be referred to as a "parent" node, and the value added to each branch may be referred to as a "child" node. A node with no branches may be referred to as a leaf, and represents the terminal node on a particular subtree.

A binary search tree is arranged by first selecting a root value. Preferably the root value is about in the middle of the range of expected values. The root value becomes the first node on the tree, and also represents the first comparison value for a search. As values are added to the tree, values that are larger than the root value become nodes on a subtree extending from one branch of the root value, while values that are smaller than the root value become nodes on a subtree extending from a second branch of the root value. In a similar manner, each node (except a leaf node), enables a decision point representing one "greater than" path and one "less than" path.

Once the tree has been arranged, a search routine is able to efficiently locate a desired value by making a series of simple comparisons at each of the nodes. If the tree has been typically arranged, each comparison will eliminate about half of the remaining items from consideration. After the search routine has located the desired value, that value is no longer available and is removed from the tree. Accordingly, the tree is rearranged to reflect the removal of the node. In a similar manner, the tree is rearranged as new values are added to the set of available items.

The usefulness and benefits of the binary search tree increase as the number of elements in the tree grows. Typically, in a well-balanced tree, the usual number of comparisons ("m") is proportional to the equation "$\log_{base\ 2}(n)$", where "n" is the number of elements to be arranged. This relationship can be more particularly described by the equation:

$$m = k * \log_{base\_2}(n)$$

where "k" is a proportionality constant. Since "k" is a constant, its value does not affect the proportional increase in search time as the number of nodes is increased. Accordingly, for purposes of explanation and simplicity, the value of "k" can be assumed to be "1". The efficiency of locating a particular element increases logarithmically according to the total number of elements. Take for example a well balanced binary search tree having 256 ($\log_2=8$) elements. The typical search would include about 8 comparisons, with each comparison representing one level in the height of the tree. If the number of elements is increased to 1024 (log=10), then the number of comparisons only increase to about 10. As illustrated, the number of comparisons and the logarithm of the elements only increased by 2 when the elements increased by a factor of 4 from 256 to 1024. Since the search time will be directly related to the number of comparisons, search time is also proportional to "log n". It will be understood that in the illustrative examples above, "n" was selected for simplicity to have a whole number $\log_2$ result, and that "n" may be otherwise provided.

The binary search tree efficiently arranges values, provided each value is unique. However, the known binary search tree is quite inefficient in accounting for duplicate values. Since each node of the tree is configured only to accommodate a "greater than" or "less than" comparison, a more complex process is used to account for duplicate values. For example, known binary search trees may provide pointers that direct the search routine away from the search tree for duplicate values.

Many common applications routinely generate duplicate vales, and therefore do not generally benefit from the use of a binary search tree arrangement. If a binary search tree is used, the tree arrangement causes undesirable overhead or inefficiencies. For example, a memory manager generally implements a search routine for locating available memory blocks at a desired minimum size. More particularly, the memory search routine attempts to find the smallest available memory block that will accommodate a memory allocation request. In one example, each memory block is defined to be 256 bytes long. In this way, an available block of 2 kb would have a value of 8 blocks, while an available block of 25 kb would have a value of 100 blocks. If the memory manager receives an allocation request for 1.9 kb, then the memory manager would preferably find a memory block with a value of 8, and if 8 is not available, then the smallest number greater than 8.

However, in the typical implementation, it is highly likely that several blocks of value 8 could be available. The search arrangement and routine must account for such duplication, and if a binary search tree is used, provide additional processor and memory resources to handle duplicated values. As memory is released and is returned to the available memory pool, it is also highly likely that the size of released blocks will be duplicative of sizes already in the pool. In practice, there are often several blocks of a particular size, and several sizes with duplications. In this way, the process used to update the binary search tree also must account for duplicative values. With such substantial duplication, the binary search tree, if used in a memory manager application, typically adds an undesirable level of overhead and inefficiency.

SUMMARY

Briefly, the present invention provides a binary search tree for efficiently organizing values for a set of items, even when values are duplicated. In generating the binary search tree, the value of each item in a set of values is determined. If a particular value is unique and is found only once in the set, then that unique value is used as a node in the binary search tree. If a value is duplicative and is found two or more times in the set, then the duplicative value is used as a hook in the binary search tree. The hook element has a list branch that is used to identify items having a value equal to the duplicative value. A node tree may be extended from a second branch of the hook, with the node tree having a base node equal to the duplicative value. The base node may have a first branch for holding a value less than the duplicative value, and a second branch for holding a value greater than the duplicative value.

In a preferred example, the improved binary search tree is used for organizing and selecting available memory blocks. A memory manager provides a set of available memory blocks, with each block having a respective size and an associated memory address. Each block of a unique size is arranged as a node in the binary search tree, and may have a first branch for holding a smaller size and a second branch for holding a larger size. If a size is duplicated, then the size is used in a hook arrangement in the binary search tree. In one example, the hook is indicated by making the memory address associated with that size into a negative number, whereas all nodes have associated positive memory addresses. The hook has a branch for listing duplicative memory blocks that are equal in size to the duplicative value or range. The hook may also have a second branch which has a node tree, with the node tree having a base node equal to the duplicative value. In this way, the hook's list branch identifies sizes equal in value to the duplicative value, while the node tree may identify sizes that are not equal in value to the duplicative value.

Advantageously, the method enables a highly efficient sorting and selection process, even when a set of items has many duplicate values. Such an efficient process is particularly useful for devices having limited memory and limited processing capabilities. Since the process is highly efficient, memory may be favorably allocated with minimal processor overhead.

DETAILED DESCRIPTION

Figure 1:
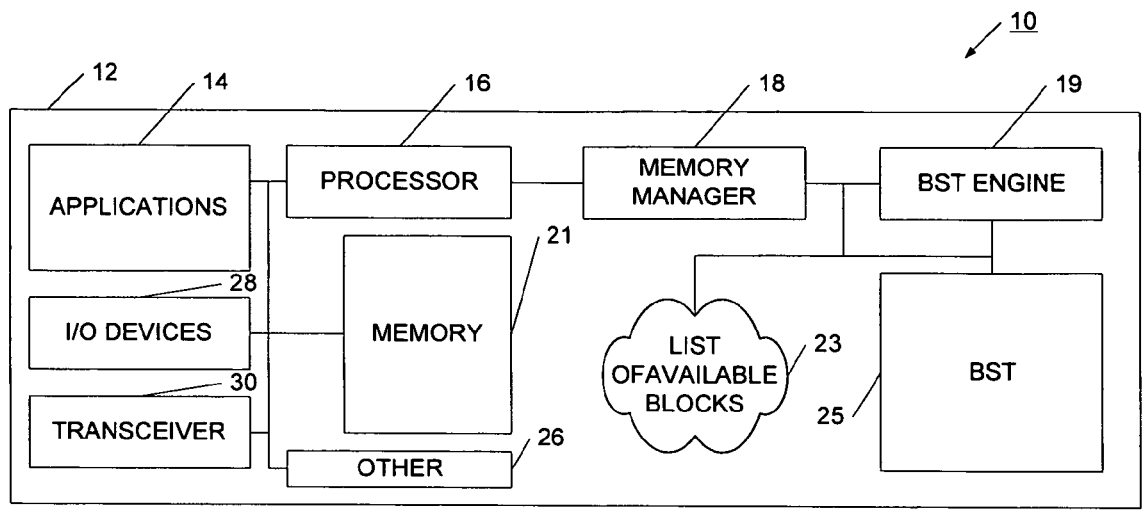
FIG. 1 is block diagram of a system using a binary search tree in accordance with the present invention.

Referring now to figure one, an electronic device 10 is shown. Device 10 operates an improved binary search tree process in accordance with the present invention. Although the improved binary search tree process is illustrated operating on device 10, it will be appreciated that the binary search tree process may be advantageously used on other devices and for other purposes. The improved binary search tree process provides device 10 with a highly efficient process to organize a set of items, even when the set of items has duplicate values. The improved binary search tree process may be implemented using a binary search tree engine 19. The binary search tree engine 19 may be a separate processor device, or may be provided as a process operating on main processor 16. The binary search tree engine and processor 16 may be implemented as a microprocessor, a programmable logic device, a gate array, discreet logic, or other known logic device. The main processor 16 provides the main functional operation and control of device 10, including selection and execution of applications 14. The processor 16 also controls input-output devices 28 such as keyboards, displays, speakers, and other I/O devices. The processor may also have a transceiver device 30. The transceiver device 30 would be useful for providing wireless communication capability for device 10. In this way, device 10 could operate as a mobile wireless phone or wireless appliance. It will be appreciated that device 10 may require other devices 26 for operation. For example, device 10 would require a power source, such as a rechargeable battery system.

Processor 16 also is coupled to and communicates with a random access memory 21. The memory 21 provides memory space for running applications, operating system functions, storing files, and enabling other device functions. The processor 16 typically has a memory manager 18 for managing and allocating memory 21. The memory manager 18 may be separate from the processor 16, or may be an application running on processor 16. In one example, the memory manager 18 is a heap manager for tracking and organizing available memory space. A memory manager, such as memory manager 18, is useful to track used and available memory, and to reclaim memory space when applications or processes no longer need a memory space. The memory manager 18 may also assign selected blocks of memory to certain applications, provide protected areas of memory, and enable more advanced memory features. For example, if available memory becomes too fragmented, a memory manager may be used to defragment the memory space.

Memory management is particularly crucial in devices having a limited memory space. In such devices only a limited number of applications may be operated from memory at one time, and the applications and processor compete for available memory space. Because of the limited memory space, it is important that the memory manager efficiently allocate and use available memory. For example, a particular application may request that the processor and memory manager allocate a memory block sufficient to accommodate a 25 KB file. The memory manager may have several blocks available that could accommodate the 25 KB request. To maximize efficiency, the memory manager attempts to locate the smallest available memory block to satisfy the memory request. In this way, memory is more efficiently used.

The binary search tree engine 19 is used to organize the available memory sizes into a highly efficient arrangement for a search by memory manager 18. To generate or update the tree, the memory manager 18 provides information regarding a set of available blocks 23. This information may include the size and start address for each block of available memory, for example. It will be appreciated that other information may be provided regarding the memory blocks. The binary search tree engine 19 applies the improved binary search tree process to the set of available blocks 23 to generate an organized binary search tree 25. The memory manager 18 then is enabled to use the binary search tree 25 to efficiently identify the smallest available memory block to satisfy a particular memory allocation request. Since the allocation and search process may be performed in a highly efficient manner, the processor 16 is able to request and allocate memory resources without incurring undesirable and unnecessary memory management overhead. Although the improved binary search tree is discussed in regard to a heap memory manager, it will be understood that the improved binary search tree may be useful in other applications and environments.

Figure 2:
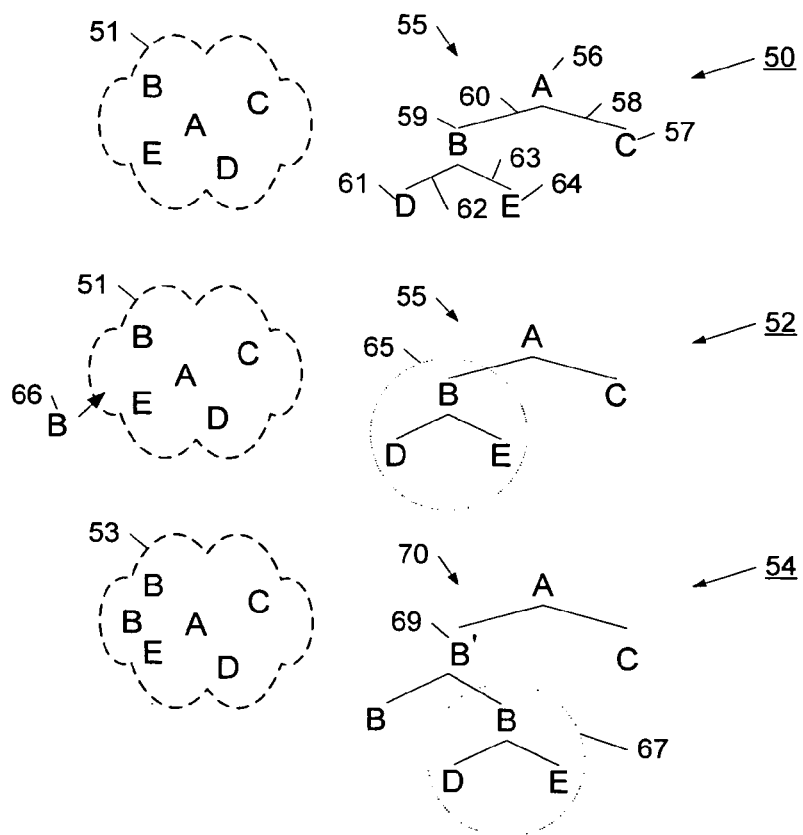
FIG. 2 is a diagram of a process for generating a binary search tree in accordance with the present invention.

Referring now to FIG. 2 an improved binary search tree process is illustrated. The improved process has a set of items 51 with each item having an associated value. As illustrated, the set of items 51 is provided in an unorganized manner. The initial set of items 51 is shown having five items, with each item having a unique value. Since each item in the set of items 51 is unique, a binary search tree 55 may be generated with each node having a unique value. For example node 56 may be set at the "A" value and have a branch 60 extending to node 59, and a branch 58 extending to node 57. Generally, the organization of binary search tree 55 shows that child node "B" has a value less than parent node "A", and child node "C" has a value greater than parent node "A". Node 59 contains item "B", and has a branch 62 extending to node 61, and a branch 63 extending to node 64. In a similar manner as above, leaf node "D" has a value less than the value of its parent node "B", and leaf node "E" has a value greater than the value of its parent node "B". Once the binary search tree 55 has been generated, a search utility may efficiently locate the best value for a particular need. In this way, process 50 shows the generation of a binary search tree 55 when all items in the set of items have a unique value.

However, many applications require organizing sets of items with duplicative or repetitive values. It will be appreciated that a value may be a specific numerical entry, an alphanumeric character, or may represent a particular range. For example, for purposes of organizing, a value of 100 may be considered equal to a value of 95 and equal to a value of 110. In this way, the granularity of search processing may be reduced. It will also be understood that a value may be associated with other information, for example, an address location or a flag setting. This other information may be stored within the structure of the binary search tree, or the tree may provide pointers or other indicators to external information.

Process 52 shows a duplicate value 66 being added to the set of items 51. In this way, there are two "B" items in the set of items, so that the set of items no longer has only unique values. When the new value 66 is added to the set of items, the process 52 first identifies which item has a duplicate value, and then identifies any subtree extending from that duplicative value. As illustrated in process 52, the "B" item has been duplicated, so process 52 identifies the node 59 in the binary search tree 55 containing the "B" value. The process 52 identifies the entire subtree 65 extending from node 59.

The process 54 then generates an updated binary search tree 70 to arrange the new set of values 53. The updated binary search tree 70 includes a "hook" 69 for representing a duplicate value. Although the word "hook" may have a meaning in the software arts, here "hook" is used to identify a comparison structure in a binary search tree. More particularly, the hook element 69 has similar structure as the node elements, but has different properties. For example, the hook may have two branches, but one branch of the hook is structured to contain a list of duplicate values, while the other branch may be structured to contain a sub tree. Since hooks use the same general structure as nodes, the hook may be efficiently implemented. In this way, the hook 69 is a new type of element for a binary search tree, and is used to indicate the presence of equal or duplicative values.

As illustrated in FIG. 2, the hook 69 has one branch for receiving the subtree 67 associated with the duplicate value. For example, the subtree 67 is the subtree 65 from the previous binary search tree 55. Of course, if the hook replaces a leaf node, then no subtree is added, but the branch may be generated at a later time if additional tree structure is needed. The hook 69 also has another branch for identifying instances of the duplicate value. As shown in process 54, this branch shows one duplicate "B" value is available for use or allocation. In this way, this branch acts to list each of the duplicate values from the item list 53.

By using a hook, a binary search tree may efficiently accommodate duplicate values. Although the addition of hook elements does cause some increase in search time, for example, by adding an additional comparison or level to a search process, the overall impact to search time is relatively minor. As discussed earlier, search time is related to the $\log_2$ of the number of elements in the tree. In this way, adding a single hook to a tree would only cause the search time to increase from $\log_2(n)$ to $\log_2(n+1)$. Even in large trees having many hooks, the increase in search time is acceptable, and if some hooks have many duplicates, then the impact to search time is even less, since the duplicates listed on a particular hook are considered to be on the same level of the search tree. The "hook" enables the efficiency of the binary search tree to be extended to many new applications, such as memory management.

Table 1 below illustrates how duplicative values are indicated on the improved binary search tree. If only one instance of a value is present, then the value is represented as a node on the tree. If two equal values are present, then one is represented on the list branch of the hook, and the other is represented in on the subtree branch of the hook. Additional duplicates are added to the list branch.

TABLE 1

| Number of items at a Given Value | Where represented | Hook? |
| --- | --- | --- |
| 0 | Not represented | No |
| 1 | 1 node | No |
| 2 | 1 node on subtree 1 on list of hook | Yes |
| 3 | 1 node on subtree 2 on list of hook | Yes |

As described, the node and the hook each hold information regarding a value or size that is useful for arranging and selecting items. The structure of the node and the hook are similar and may enable the node and the hook to be associated with additional information regarding an item. For example, the structure may identify a location or other attribute for the item. This additional information may be held within the structure itself, or the structure may provide pointers or flags that identify external information. In one example, the structure holds a value, and also has data that identifies a location where that value is located. When populating such a binary search tree, a node is identified by setting a flag in the location data to a "0", and a hook is identified by setting a flag in the location data to a "1". In this way, a search routine simply checks the flag to identify if an element represents a node element or a hook element. In one particularly efficient implementation, the flag is the most significant bit of the location data, and represents the sign of the information. Since location data is most often positive information, the presence of a negative number conveniently identifies the information as indicating a hook structure.

Alternatively, the hook may be identified, for example, by setting the value of the hook to a negative number or by setting another flag in the bit representation of the value. In this way, the search routine may easily and efficiently distinguish between a hook and a node. If the value is positive, or the flag bit is not set, then the search routine identifies the value as a node and applies the "greater than" and "less than" comparison. If the value is negative, or the flag bit is set, then the search routine identifies the value as a hook and looks to one branch for a list of values, and looks for a subtree extending from the second branch. It will be appreciated that the hook may be identified in alternative ways, dependant on application specific requirements.

Figure 3A:
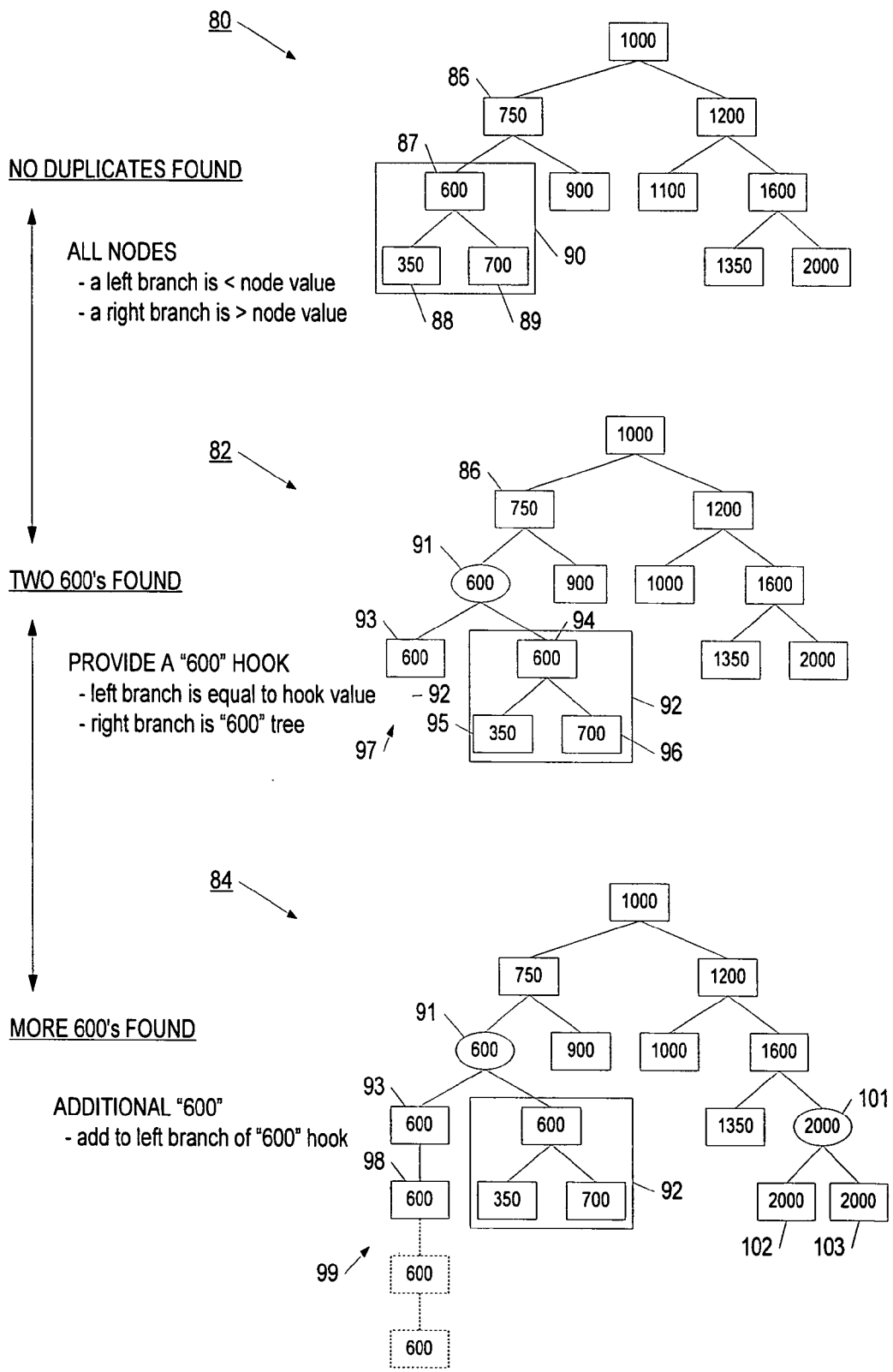
FIG. 3A is a diagram of values organized using a binary search tree in accordance with the present invention.

Referring now to FIG. 3A, a more specific example of the improved binary search tree is illustrated. Binary search tree 80 is illustrated organizing a set of numeric values. Each of the values also may be associated with additional information or data that is useful in the search process. For example, values may be associated with location data that identifies where the value may be found. In binary search tree 80, there are no duplicate values, so each value may be uniquely identified as a node on the binary search tree 80. Each node is capable of supporting two branches, with one branch for receiving values smaller than the node, and the other branch for receiving values larger than the node. For example, node 86 has a value of 750. A right branch has a larger value of 900, while the left branch has a smaller node 87 of 600. In a similar manner, the node 87 has a value of 600 with a right branch having a node 89 having a value of 700, and a left branch having a node 88 with a value of 350. By way of convention, the parent node 87 comprises a subtree 90 which includes child nodes 88 and 89."2000"

As illustrated in FIG. 3A, a second value of "600" is added to the set of values. In this way, the binary search tree must accommodate a duplicate, or second, value of "600". To accommodate the duplicate "600", a hook 91 is added to the updated binary search tree 82. By way of convention, a hook is illustrated as an oval-shape, while a node is illustrated as a rectangular shape. The hook 91 is added with a value equal to the duplicated value. The hook 91 has two branches, with one branch used to hold a list 97 of available duplicated values. In binary search tree 82, one duplicate value of 600 is shown as leaf node 93. The other branch of the hook 91 receives a subtree 92 extending from parent node 94. Node 94 is set to the duplicative value also. In this way, the subtree 92 is like subtree 90.

Figure 3B:
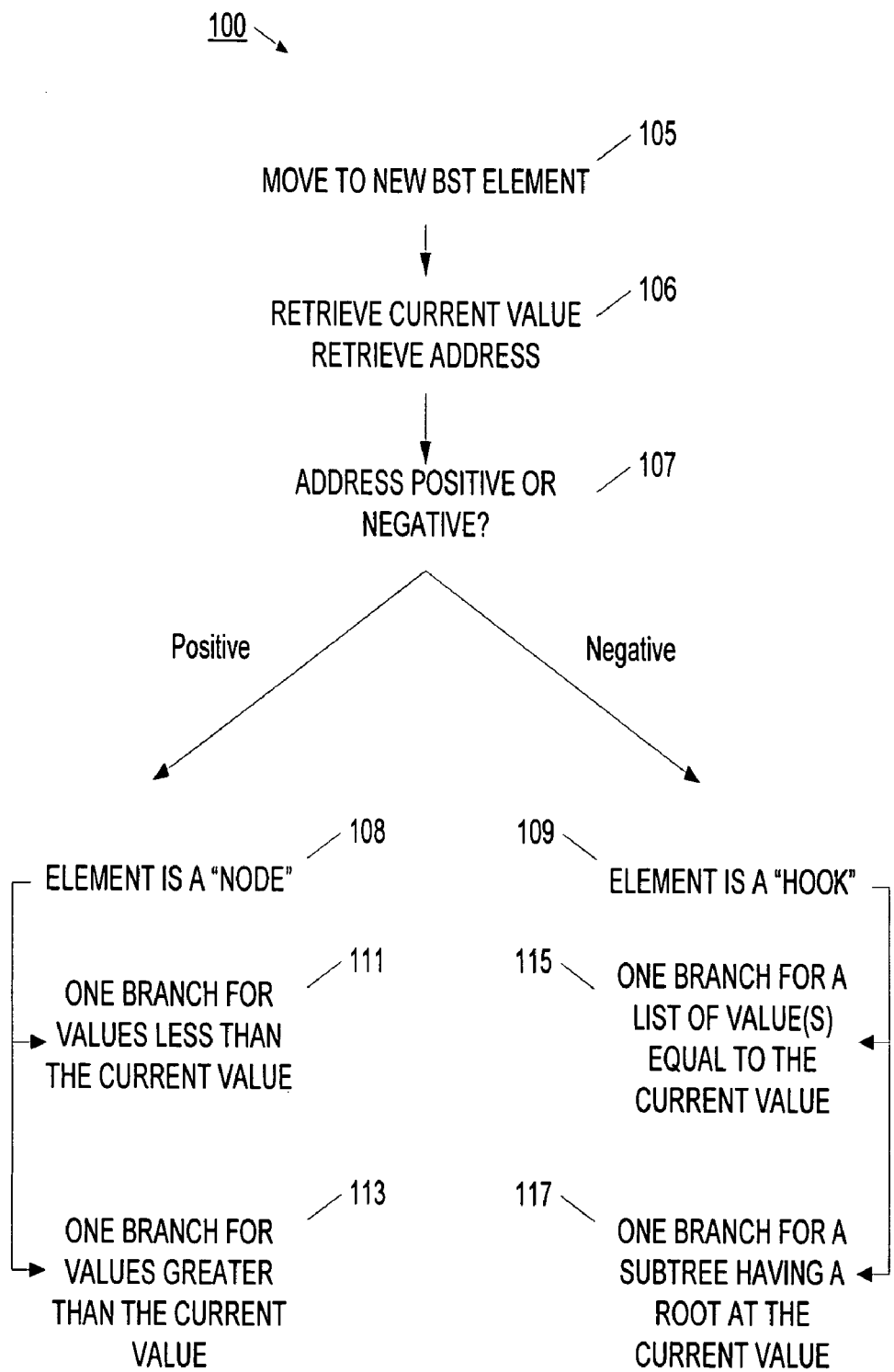
FIG. 3B is a diagram of a search routine using a binary search tree in accordance with the present invention.

In one example, each node and hook has a value and an additional data point which associates that value with a location. The location data point may be a memory address or other position indicator. Generally, such location data is useful for location purposes only as positive (non-negative) information. Accordingly, the sign bit for the location data may be used as a flag to differentiate a node element from a hook element. Further, it is particularly efficient to use the address for identification purposes, as the address information is generally needed upon selecting a proper value. FIG. 3B illustrates a flowchart 100 of how a searching process may determine if an element of a binary search tree is a hook or a node. The flowchart 100 shows that the search process moves to a new element of the binary search tree (BST) in block 105. The search process retrieves an address data point associated with the new element as shown in block 106. The address data point may be held within the element's data structure, or may point to another location where the address may be found. The current value of the new element may also be retrieved, or may be retrieved later in the process.

The process 100 then determines if the location data point is a positive number or a negative number. In this way, the sign bit (typically the most significant bit) is used as a flag to assist in differentiating between a hook and a node. More particularly, if the address is positive, then the new element is identified as a node as shown in block 108, and if the address is negative, then the new element is identified as a hook as shown in block 109. If the element is a node, then one branch may be used to hold values less than the current value (block 111) while the other branch may be used to hold values greater than the current value (block 113). As described earlier, the node may have no branches, one branch, or two branches depending on how the search tree is populated. If the new element is a hook, then one branch may be used to hold a list of values equal to the current value (block 115) while the other branch may be used to hold a subtree with the current value as its subroot value (block 117).

Referring again to FIG. 3A, the binary search tree 82 illustrates that subtree 92 includes the parent node 600, a left branch having node 95, and a right branch having node 96. In use, a searching process would encounter the hook 91, and if the searching process desired to use the value "600", then the duplicative value 93 would be allocated for use by the allocation process. However, if the searching process did not want to use the "600" value, then the process would continue to subtree 92. In this way, binary search tree 82 provides a highly efficient arrangement for valued items, even when items have duplicative values.

Binary search tree 84 shows more values at "600" being added to the set of items. Each time an additional value of "600" is added, that duplicative item is added to the list 99 associated with the hook 91. For example, leaf node 98 represents the next duplicative 600 added to the set of items. As values of "600" are allocated and used, duplicative nodes are removed from list 99. Finally, when the last leaf node has been removed from the list 99, the hook 91 is replaced with the node tree 92.

A duplicate "2000" has also been added to search tree 84. Accordingly, the "2000" node from the previous search tree 82 has been replaced with a "2000" hook 101. One instance of the "2000" appears as a leaf node 102 on the list branch of the hook, while the other "2000" appears as a node 103 on the subtree branch of the hook. Additional branches may be extended from the node 103 as required by new value additions. For example, if "2025" is added, then a "2025" node would be added as a branch from node 103.

Figure 4:
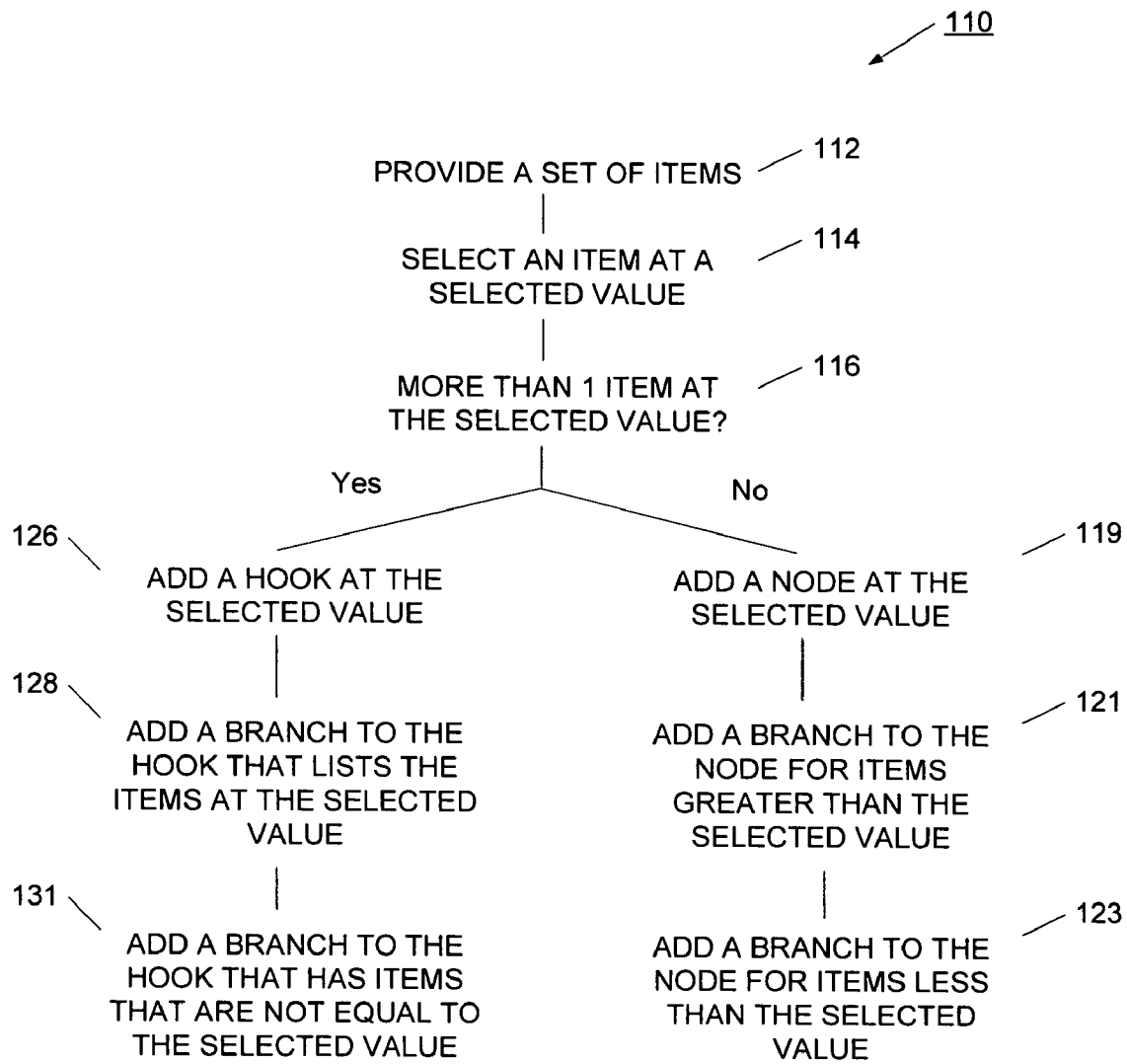
FIG. 4 is a flowchart of a process to generate a binary search tree in accordance with the present invention.

Referring now to FIG. 4, a flowchart of a binary search tree process 110 is illustrated. In the process 110, a set of valued items is provided as shown in block 112. The process selects one of the items from the set of items and identifies the value of the item as shown in block 114. The process determines if the selected value is unique or if it is duplicative of a value already in the binary search tree as shown in block 116. If the value is unique for the binary search tree, then a node is added to the search tree at the selected value as shown in block 119. The node may have a branch for receiving values greater than the selected value as shown in block 121, and may have a branch for receiving values less than the selected value as shown in block 123. If in block 116 the selected value is found to already exist in the binary search tree, or to be duplicative of a value in the set of items, then a hook is added to the binary search tree at the selected value as shown in block 126. As described earlier, the hook is a new type of element for the binary search tree which indicates the presence of duplicative or repetitive values. In one example, the hook is distinguished from a node by associating a negative address number with the hook value. In this way, a search operation may test the sign of the address location, and if negative, identify the element as a hook. Once a hook has been added at a given value, then additional duplicate values are added to that hook's list branch. In this way, one branch of the hook lists items at the duplicative value as shown in block 128. The other branch of the hook is used for receiving a subtree with a parent node valued the same as the duplicative value as shown in block 131. Using process 110, a highly efficient binary search tree may be generated even with the presence of duplicate or repetitive values.

Figure 5:
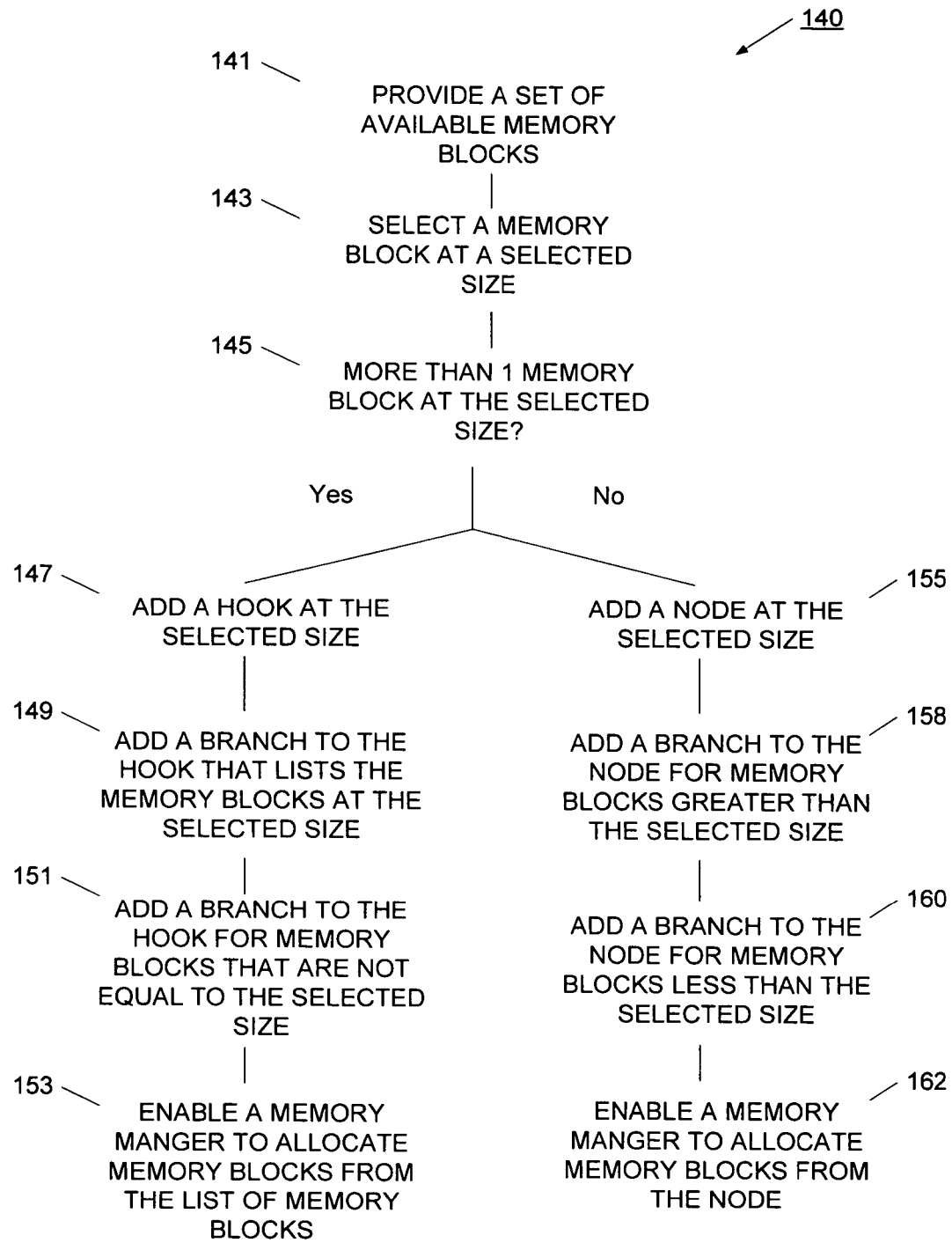
FIG. 5 is a flowchart of a process to generate a binary search tree in accordance with the present invention.

Referring now to FIG. 5, a process for generating a binary search tree 140 is illustrated. Process 140 is more particularly focused to a binary search tree for organizing a set of available memory blocks. In this way, a set of available memory blocks is provided as shown in block 141. The set of available memory blocks may be identified by block size, start address, and stop address. It will be appreciated that other information may be included to identify available memory blocks. It will also be appreciated that the memory blocks may be identified using a range rather than a specific numerical value. For example, an available memory size of 1000 may include a certain number of bytes larger and a certain number of bytes smaller than the 1000 numeric value. By reducing the granularity of memory block identification, it may be possible to simplify memory block allocation, although there may be some decrease in the efficiency of memory utilization. It will be appreciated that one skilled in the art can identify and accommodate the trade-offs between granularity and efficiency.

The process 140 then selects one of the memory blocks from the set of available memory blocks and identifies its size as shown in block 143. In block 145, the process determines if the memory size is unique or duplicative of another value in the binary search tree. If the memory block is unique, then a node is added to the binary search tree at the identified size as shown in block 155. A branch may be added to that node for receiving sizes larger than the node size as shown in block 158, and a branch may be added to the node for memory blocks less than the selected size as shown in block 160. As a node in the binary search tree, the memory manager would be able to allocate that memory block associated with the node as shown in block 162.

If the memory size was determined to be duplicative in block 145, then a hook is added at that duplicative size 147. More particularly, the hook is used to replace the node in the binary search tree at the duplicative value. The hook is a special type of element in the binary search tree, and is used to indicate the presence of equal, duplicative, or repetitive values. In this way, the hook is not an allocatable item, but is used to facilitate an informational and organizational flow. Once a hook has been added at a given value, then additional duplicate values are added to that hook's list branch. Accordingly, one branch of the hook is used to list all of the duplicative values as shown in block 149. The other branch of the hook is used to hold values that are not equal to the duplicative value. More particularly, this branch would be able to receive a subtree extending from a node equal to the value of the duplicative value. Although the hook itself is not allocatable or usable, the memory manager would be enabled to allocate the items identified in the list of memory blocks on the list branch of the hook.

Figure 6:
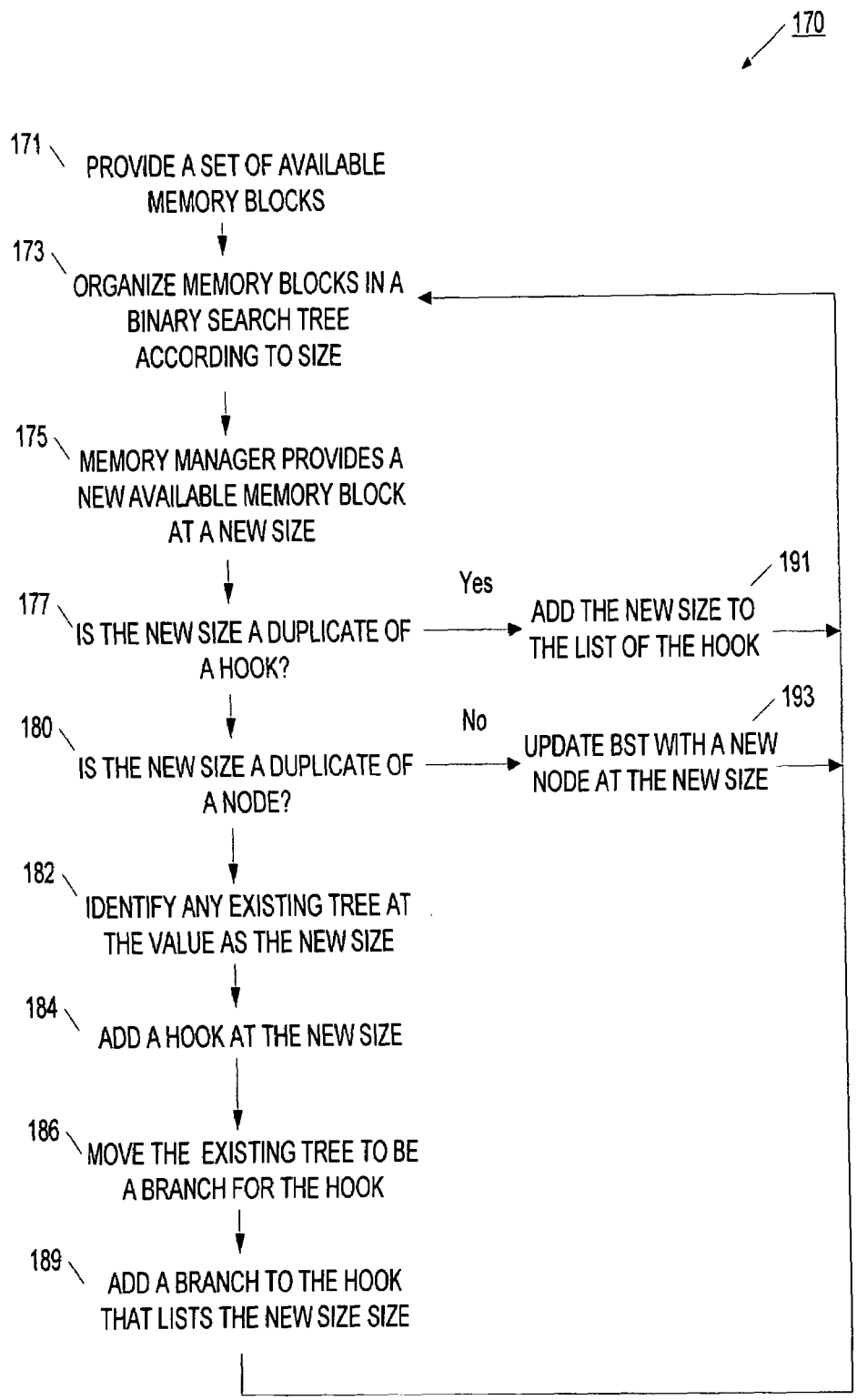
FIG. 6 is a flowchart of a process to generate a binary search tree for available memory blocks in accordance with the present invention.

Referring now to FIG. 6, a process for generating a binary search tree 170 is illustrated. In process 170, a set of available memory blocks is provided as shown in block 171. The memory blocks are organized in a binary search tree according to size as illustrated in block 173. A memory manager provides a new available memory block at a particular size as shown in block 175. The size of the memory block is compared to items already placed on the binary search tree. The new value is compared to hooks already present on the binary search tree as shown in block 177. If the new size is already represented as a hook, then the new size is added as a leaf node to the list of that hook as shown in block 191. This list, therefore, represents the duplicative elements available at that particular size. If the new size is not present as an existing hook, then the new size is compared to existing nodes in the binary search tree. If the new size is unique, and therefore not a duplicate, then the binary search tree is updated with a new node at the new size as shown in block 193. However, if the new size is duplicative of a node, then subtree, if any, for that duplicative value is identified as shown in block 182. A hook replaces the previous node at the duplicative value as shown in block 184, and the subtree for that duplicative value is moved to one branch of the hook as shown in block 186. The duplicate value is then added to the other branch of the hook, which is used to hold the list of available duplicate items.

In block 184, the hook may be identified by setting a flag in the hook's data. For example, the hook has a size value for a memory block, and may also have an associated starting memory address for that memory block. The process 170 may cause the memory address to be stored as a negative number, thereby indicating to a later search process the presence of a hook element.

Figure 7:
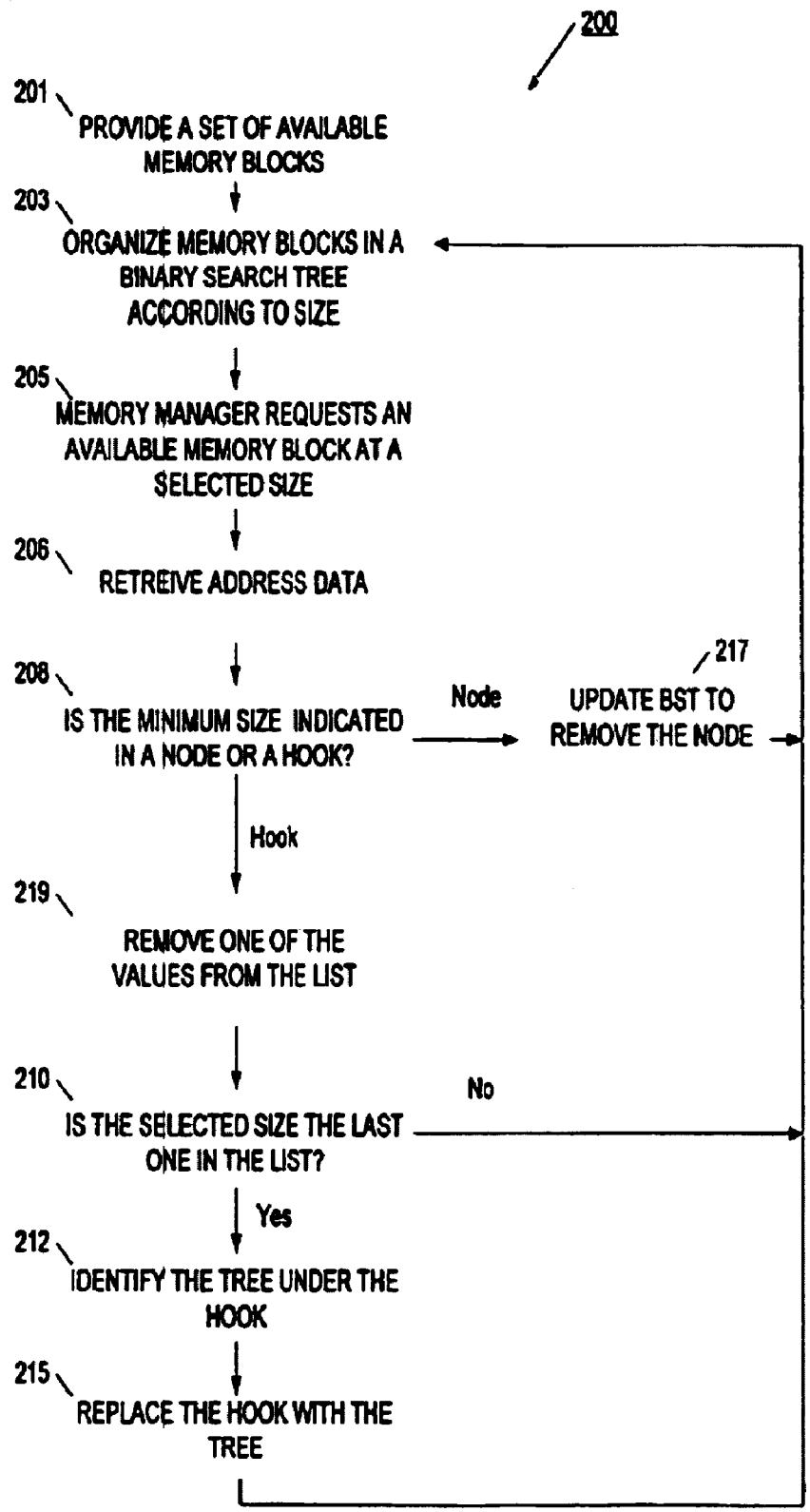
FIG. 7 is a flowchart of a process to use a binary search tree for selecting an available memory block in accordance with the present invention.

Referring now to FIG. 7, a method of using memory blocks 200 is illustrated. In method 200, a set of available memory blocks is provided as shown in block 201. The memory blocks are organized into a binary search tree according to size as shown in block 203. The binary search tree is constructed with nodes and hooks, and therefore is capable of efficiently organizing duplicate or repetitive values. In block 205, a memory manager requests an available memory block at a selected size. In one example, the binary search tree is used to find the smallest available memory block to accommodate the request for the memory manager. In this way, the memory manager may allocate the minimum sized memory block for the required application.

In finding the minimum sized memory block, a search routine generally makes comparisons at many node and hook elements of the binary search tree. At each element, the search routine identifies if the element is a node or a hook, makes value comparisons, and may continue traversing through the binary search tree to find a better value. As indicated in block 206, the search routine may retrieve address data that is associated with an element of the binary search tree. Although process 200 uses address data, it will be appreciated that other data or flags may be used. The address data is used by search routine to identify if the element is a hook or a node. For example, if the address is a negative number then the element is a hook, and if the address is a positive number then the element is a node. In this way, the address is used to distinguish between nodes and hooks, and also is used to assist the memory manager in allocating a selected memory block.

If the minimum size is indicated in a node of the binary search tree as shown in block 208, then the memory manager is able to allocate that minimum size and the binary search tree is updated to remove the node at that size as shown in block 217. However, if the minimum size is indicated in a hook as shown as block 208, then one of the leaf nodes in the list is removed and allocated for the memory manager. If the allocated memory block was the last leaf node on the hook list as shown in block 210, then the subtree on the other branch of the hook is identified as shown in block 212. The hook is then removed and replaced with the node tree as shown in block 215. In this way, the binary search tree illustrates that the value is once again a unique value.

It will be appreciated that the hook may be identified in alternative ways. In one example, a hook is identified by its numeric sign. More specifically, the hook value may be identified as a negative number, while the node value may be identified as a positive number. In this way, the absolute value of a hook or node represents the value of an item, and the sign represents whether the element is a hook or a node.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A method for managing a memory, comprising:
providing a plurality of available memory blocks, each memory block having a size;
providing a tree comprised of elements where each element has between 0 and 2 branches inclusive, a value, and an indicator, the indicator enabled to indicate if an element is further a hook-element, each hook-element comprising a first branch to a linked list where each element in the linked list has a value the same as the hook-element value, and a second branch to an element with a same value as the hook-element, and where each of the plurality of available memory blocks is associated with one element with the size of the associated memory block being equal to the value of the associated element;
requesting an allocation of memory comprised of a request size;
searching for one of the available memory blocks that satisfies the allocation request, the searching process further comprising:
comparing the request size to a first value of a first element;
determining if the indictor indicates the first element is a hook-element and if the first value is equal to the request size;
traversing, if the indicator indicates a hook-element and the first value and request size are equal, to the hook-element's first branch;
traversing, if the indicator indicates a hook-element and the first value and request size are unequal, to the hook-element's second branch;
traversing, if the indicator did not indicate a hook-element and the request size is larger than first value, to a branch comprised of elements with values all greater than the first value;
traversing, if the indicator did not indicate a hook-element and the request size is smaller than first value, to a branch comprised of elements with values all smaller than the first value;
continuing determining and then traversing until an element that is not a hook-element and has a same value as the request value is reached, being a request element thereby;
removing the request element from the tree; and
making the memory block associated with the removed element available for the memory request.

2. The method according to claim 1, further comprising:
providing each element with an address; and
indicating an element is a hook-element by providing a negative number as the address.

3. The method according to claim 1, wherein the being equal to the value of the associated element further comprises being equal to the absolute value of the associated element, and the indicator indicates the element is a hook-element when the value is negative.

4. A hand held portable device, comprising:
RAM memory;
input and output subsystems;
a processor; and
a binary search tree engine implementing a memory management process further comprising:
receiving a request for an allocation of memory comprised of a request size;
searching for an available memory block that satisfies the allocation request, the searching process further comprising:
traversing a binary tree, the tree comprised of elements where each element has between 0 and 2 branches inclusive, a value, and an indicator, the indicator enabled to indicate if an element is further a hook-element, a hook-element comprising a first branch to a linked list and a second branch to an element with a same value as the hook-element, and where each of a plurality of available memory blocks is associated with one element with a size of the associated memory block being equal to the value of the associated element;
comparing the request size to a first value of a first element;
determining if the indictor indicates the first element is a hook-element and if the first value is equal to the request size;
traversing, if the indicator indicates a hook-element and the first value and request size are equal, to a linked list of elements having a same value as the request size;
traversing, if the indicator indicates a hook-element and the first value and request size are unequal, to an element having a same value as the request size;
traversing, if the indicator did not indicate a hook-element and the request size is larger than first value, to a branch comprised of elements with values all greater than the first value;
traversing, if the indicator did not indicate a hook-element and the request size is smaller than first value, to a branch comprised of elements with values all smaller than the first value;
continuing determining and then traversing until an element that is not a hook-element and has a same value as the request value is reached, being a request element thereby;
removing the request element from the tree; and
making the memory block associated with the removed element available for the memory request.

5. The device according to claim 4, further comprising a transceiver and an antenna.

* * * * *

UNITED STATES PATENT AND TRADEMARK OFFICE
CERTIFICATE OF CORRECTION

PATENT NO. : 7,225,186 B2
APPLICATION NO. : 10/810753
DATED : May 29, 2007
INVENTOR(S) : Sumit Rao Page 1 of 1

It is certified that error appears in the above-identified patent and that said Letters Patent is hereby corrected as shown below:

Drawing sheet 5, Fig. 5, reference designator 153 should read:

-- MANAGER --

Drawing sheet 5, Fig. 5, reference designator 162 should read:

-- MANAGER --

Signed and Sealed this

Eighteenth Day of March, 2008

JON W. DUDAS
*Director of the United States Patent and Trademark Office*